United States Patent [19]
Kuo et al.

[11] Patent Number: 5,608,050
[45] Date of Patent: Mar. 4, 1997

[54] PROCESS FOR THE MANUFACTURE OF CELLULOSE ACETATE

[75] Inventors: Chung M. Kuo; Richard T. Bogan, both of Kingsport, Tenn.

[73] Assignee: Eastman Chemical Company, Kingsport, Tenn.

[21] Appl. No.: 573,678

[22] Filed: Dec. 18, 1995

[51] Int. Cl.$^6$ .................... B08B 3/06; B08B 1/02
[52] U.S. Cl. .................. 536/69; 536/70; 536/71; 536/73; 536/74
[58] Field of Search .................. 536/58, 63, 69, 536/70, 71, 73, 74, 76

[56] References Cited

U.S. PATENT DOCUMENTS

| | | | |
|---|---|---|---|
| 2,585,516 | 2/1952 | Thomas | 536/70 |
| 2,923,706 | 2/1960 | Campbell et al. | 536/73 |
| 3,755,297 | 8/1973 | Campbell et al. | 536/69 |
| 3,767,642 | 10/1973 | Campbell et al. | 536/69 |
| 4,439,605 | 3/1984 | Yabune et al. | 536/71 |

FOREIGN PATENT DOCUMENTS

| | | |
|---|---|---|
| 565099 | 10/1958 | Canada . |
| 0626391A1 | 5/1993 | European Pat. Off. . |
| 0638244A1 | 12/1993 | European Pat. Off. . |

OTHER PUBLICATIONS

Malm et al (eds) "Cellulose and Cellulose Derivatives", Part 2 of *High Polymers*, 5, 2, Interscience Publishers (1954).
Takahashi et al, *Kobunshi Kagaku*, 27, 302, p. 394, (1970).

*Primary Examiner*—Nathan M. Nutter
*Attorney, Agent, or Firm*—Charles R. Martin; Harry J. Gwinnell

[57] ABSTRACT

The specification discloses a process for the manufacture of cellulose acetate. The process reacts, at a temperature suitable for acetylation, an acetic acid activated pretreated cellulose raw material containing 100 parts cellulose by dry weight, and 0.5 to 40 parts of a bisulfate catalyst by dry weight of the cellulose. The bisulfate catalyst is selected from lithium bisulfate, sodium bisulfate, and potassium bisulfate. To enhance mixing with the activated and pretreated cellulose, the catalyst may be mixed with 2 to 4 parts of acetic anhydride by dry weight of the cellulose, and 4 to 6 parts of acetic acid by dry weight of the cellulose. In a further embodiment, 0.05 to 10 parts of a strong Bronsted acid by weight of the dry cellulose may be added as a co-catalyst.

18 Claims, No Drawings

PROCESS FOR THE MANUFACTURE OF CELLULOSE ACETATE

FIELD OF THE INVENTION

This invention relates to a process for manufacturing cellulose acetate. More particularly, this invention relates to a process employing a bisulfate catalyst or catalyst system for manufacturing cellulose acetate.

BACKGROUND OF THE INVENTION

The commercially available and industrially important cellulose acetates are almost all produced by reaction of cellulose and acetic anhydride using strong acids as catalysts and acetic acid as a solvent. Compounds generally used as catalysts for cellulose acetylation include sulfuric acid, perchloric acid, and sulfonic acids. Sulfuric acid, the most commonly used catalyst, is believed to be the best catalyst for the commercial manufacture of cellulose acetates in an acetic acid system. Other catalysts are precluded from commercial applications because they are not effective, impractical, or dangerous to practice on an industrial scale. See, Malm, C. J., Hiatt, G. D., Cellulose and Cellulose Derivatives, Part II of High Polymers, Ott, E., Spurlin, H. M., Graffin, M. W. eds., Vol. 5, 2d. ed., Interscience Publishers, New York, 1954.

A typical industrial cellulose acetate process using sulfuric acid as the catalyst in the so-called acetic acid system usually comprises at least two steps. First, the cellulose raw materials are activated or pretreated by mixing the raw material with water, aqueous acetic acid, and acetic acid, or acetic acid containing small amount of sulfuric acid. To be useful in an acetic acid process, the cellulose raw material generally has a high α-cellulose content and a relatively high molecular weight. To accomplish the acetylation, the activated cellulose is reacted with a mixture of prechilled acetic anhydride, acetic acid and sulfuric acid to produce primary cellulose acetate. The primary cellulose acetate produced in the acetylation step, also called cellulose triacetate, may be subjected to hydrolysis (or ripening) to produce cellulose acetate of any desired degree of acetyl content.

The typical industrial cellulose acetate process suffers from one or more of several disadvantages. A typical industrial process requires very high quality cellulose raw materials having a high α-cellulose content. These high quality celluloses are usually required to meet the desired end-use applications of the cellulose acetate product. However, the acetylation step, particularly when catalyzed with sulfuric acid, can degrade the cellulose polymer resulting in cellulose acetate products having low intrinsic viscosity (IV) and low molecular weight (MW). Low α-cellulose raw materials, for this reason, generally cannot be used in typical industrial processes.

The acetylation step in a typical industrial cellulose acetate process is highly exothermic producing a large quantity of heat. Therefore, not only must the liquid chemicals consisting of acetic acid and acetic anhydride be cooled before acetylation, but the reactor must also generally be cooled externally to regulate the reaction. This cooling is necessary to obtain cellulose acetate with the desired degree of polymerization. Accordingly, typical industrial cellulose acetate processes often require a large quantity of refrigeration to cool and regulate the reaction temperature during the acetylation step. This increases the cost of production.

The typical industrial process also requires a certain amount of a sulfuric acid catalyst (generally 6% to 20% based on the weight of dry cellulose) to uniformly acetylate the cellulose and produce cellulose acetate with good solubility in the acetic acid medium. To recover and process the desired cellulose acetate, the large amount of sulfuric acid catalyst must be neutralized during or after acetylation or as a step in a later hydrolysis processes. Having to neutralize the sulfuric acid increases production costs and may result in subsequent production difficulty such as plugging of the processing lines by insoluble sulfate salts. Higher sulfuric acid concentrations during acetylation generally result in a cellulose acetate product having higher chemically combined sulfuric acid in the cellulose acetate product. Cellulose acetate with high levels of chemically combined sulfuric acid is not heat stable.

Various processes have been reported to overcome some of the disadvantages of a conventional cellulose acetate production process. U.S. Pat. No. 2,923,706, corresponding to Canadian Patent No. 565,099, reports using small amounts, less than 1% by weight of dry cellulose, of sulfuric acid as catalyst while performing the cellulose esterification at temperatures above 50° C. The process, however, requires that the sulfuric acid be uniformly distributed throughout the cellulose be means of a special pretreatment process.

U.S. Pat. No. 3,767,642 reports a process for producing secondary cellulose acetate from low cost wood pulp with low α-cellulose content. According to this patent, the secondary cellulose acetate is produced from primary cellulose acetate by a high-temperature hydrolysis process at a hydrolysis temperature ranging from 125° C. to 170° C.

U.S. Pat. No. 4,439,605 also reports a process to produce secondary cellulose acetate using high-temperature acetylation and hydrolysis steps. The primary cellulose acetate for this process is produced by acetylating cellulose at a temperature from 50° C. to 85° C. with a relatively low sulfuric acid catalyst concentration, ranging from 0.5 to 5.0 weight parts per 100 weight parts dry cellulose. The process fully neutralizes the acid catalyst before introducing steam into the reaction mixture to elevate the system's temperature to between 125° C. and 175° C. Maintaining this temperature for 30 minutes to 6 hours hydrolyzes the primary acetate to cellulose diacetate. Reportedly, this process may also be used to produce cellulose acetate from low-grade pulps.

A process for producing cellulose acetate from a low α-cellulose raw material by selectively depolymerizing the impurity in the hemicellulose, in particular glucomannan, in the raw material has been reported in European Patent Application No. 0 626 391 A1. According to this report, the depolymerizing is accelerated by increasing the amount of acetylation catalyst, in particular sulfuric acid, in the pretreatment. Acetylation is then conducted while controlling the reaction temperature in the range of 50° C. to 85° C. Hydrolysis is effected at a temperature ranging from 125° C. to 175° C., after neutralizing the sulfuric acid catalyst.

Another approach to the synthesis of cellulose acetate has been reported in U.S. Pat. No. 2,585,516. As described in this patent, the cellulose is impregnated with a mixture of a carboxylic acid derivative and a compound of an inorganic sulfoxy acid and esterified with aliphatic acid anhydrides, such as acetic anhydride, at temperatures above 90° C. The carboxylic acid compounds used are amides or carboxylic acid salts formed with ammonia or an amine having at least one amino hydrogen. The inorganic sulfoxy compounds include sulfuric acid, its partial amides and esters, sulfurous acid, thiosulfuric acid, tetrathionic acid, persulfuric acid as well as their salts with ammonia or an amine having at least one amino hydrogen.

Takahashi and Takahashi, (Kobunshi Kagaku, Vol. 27, No. 302, p. 394, 1970), report a similar process for synthesizing cellulose acetate. The process involves immersing cotton linters as a cellulose raw material in an aqueous acetic acid solution of various sulfates containing metallic or ammonium ions. After the excess imbibition acid solution was removed, the raw material is dried before acetylation. The resultant cellulose having a catalyst concentration of 2%, is then acetylated at 98° C. Cotton linters impregnated with catalysts such as Cd—, Zn—, or Al-sulfate or Fe-alum were reportedly acetylated to triacetyl cellulose smoothly within 8 minutes and those impregnated with $(NH_4)_2SO_4$, $(NH_4)HSO_4$, $(NH_4)_2S_2O_8$ or Mohl's salt were similarly acetylated within 25 minutes. For the sulfates containing Fe or $NH_4$ cations, the reaction became faster as the salts contained a larger amount of $SO_4^{2-}$. It was also found that the degree of polymerization of the acetates was markedly decreased due to the high reaction temperature.

European Patent Application No. 0 638 244 A1 reports a process to acetylate cellulose using an adduct of sulfuric acid and N,N-dimethyl acetamide as a catalyst. The acetylation is conducted with acetic acid solvent at a temperature of 10° C. to 90° C. with 1.5% to 30% catalyst by weight of catalyst adduct. A disadvantage in this process, however, relates to its by-products. The N,N-dialkylamides, ammonia by-products, and amine by-products resulting from the reaction with acetic anhydride during acetylation are generally unacceptable for industrial practice due to their posssible toxicity.

Cellulose acetate production processes, such as those discussed above, typically acetylate cellulose at high temperature with a sulfuric acid catalyst, hydrolyze at still higher temperatures, or both acetylate and hydrolyze at very high temperatures. Certain disadvantages exist in such processes. For example, high temperature processes generally produce cellulose acetate products having poor solubility in organic solvents, such as acetone, or with low whiteness or both. Excessive reaction temperatures also tend to degrade the cellulose polymeric structure yielding cellulose acetate products with low intrinsic viscosity and corresponding low molecular weight.

SUMMARY OF THE INVENTION

As can be seen, a need exists for a more economical process for manufacturing cellulose acetate. The desired process should readily acetylate cellulose raw materials having high or low α-cellulose content with acetic anhydride and a catalyst in acetic acid solvent without substantial loss of intrinsic viscosity. The process should also not require costly cooling of the acetylation reaction. The reaction would preferably be carried out adiabatically or with very little external heat input. The catalyst or catalyst residues should produce very little or no undesirable effects on acetylation, hydrolysis, and any other subsequent processing step.

The present invention provides a new process for the production of cellulose acetate that answers needs existing in the art. Accordingly, the present invention relates to a process for the manufacture of cellulose acetate. The process proceeds at a temperature suitable for acetylation employing an acetic acid activated, pretreated cellulose raw material containing 100 parts cellulose by dry weight, and 0.5 to 40 weight parts of a bisulfate catalyst by dry weight of the cellulose. The bisulfate catalyst is selected from lithium bisulfate, sodium bisulfate, and potassium bisulfate. To enhance mixing with the activated and pretreated cellulose, the catalyst may be mixed with 2 to 4 weight parts of acetic anhydride by dry weight of the cellulose, and 4 to 6 weight parts of acetic acid by dry weight of the cellulose. In a further embodiment, 0.05 to 10 weight parts of a strong Bronsted acid per 100 weight parts of the dry cellulose may be added as a co-catalyst.

Bisulfate compounds, with or without an additional small amount of a strong Bronsted acid, very effectively catalyze cellulose acetylation. In the process of the invention, higher temperatures may be used to fully acetylate the cellulose without causing excessive degradation of the cellulose polymer. This contrasts with conventional acetylation processes which require cooling in order to avoid excessive loss of product molecular weight. Advantageously, the acetylation yields smooth and substantially gel-free primary cellulose acetate in acetic acid solutions. The acetylation temperature in accordance with this invention may be varied from about 40° C. to about 90° C., depending on the amount of catalyst and co-catalyst used. In general, no external cooling is necessary during the acetylation reaction. Therefore, the process achieves a significant reduction in cellulose acetate production costs associated with the need for refrigeration during the acetylation step.

DETAILED DESCRIPTION OF THE INVENTION

The present invention provides a process for acetylation of cellulose. Acetic acid present in the process acts as a solvent for the cellulose acetate formed. The process is characterized by using bisulfate or a combination of a bisulfate and a strong Bronsted acid as the acetylation catalyst. The cellulose triacetate (primary acetate) manufactured by the present invention may be hydrolyzed to provide cellulose acetate esters with any desired free-hydroxyl content and to therein modify their chemical and physical properties to meet specific end use applications.

As discussed above, the present invention provides a process for the manufacture of cellulose acetate. The process proceeds at a temperature suitable for acetylation employing an acetic acid activated and pretreated cellulose raw material containing 100 weight parts cellulose by dry weight and 0.5 to 40 weight parts of a bisulfate catalyst. The bisulfate catalyst is selected from lithium bisulfate, sodium bisulfate, and potassium bisulfate. Before combining it with the activated and pretreated cellulose, the catalyst may preferably be combined with 2 to 4 weight parts of acetic anhydride by dry weight of the cellulose, and 4 to 6 weight parts of acetic acid by dry weight of the cellulose. In a preferred embodiment, 0.05 to 10 parts of a Bronsted acid by weight per 100 weight parts of the dry cellulose may be added as a co-catalyst.

A wide variety of cellulose raw materials may be used to manufacture cellulose acetate in accordance with this invention. Cellulose sources useful in this invention include hardwoods, softwoods, cotton linters, and non-wood plant fibers. The acetylation process according to the invention may also be used to produce cellulose acetate from so-called low cost cellulose raw materials, e.g., low α-cellulose content wood pulps and low molecular weight cellulose pulps. For example, the following cellulose raw materials may be used: Placetate F cellulose, a product of Rayonier Pulp & Paper Co., USA; Viscocell cellulose, a product of International Paper Co., N.Y.; Natchez HVX cellulose, also a product of International Paper Co., N.Y.; and Temsolv cellulose, a product of TenBec Inc., Montreal, Canada.

When low α-cellulose content cellulose is used as the raw material, prior art processes generally employ large amounts of sulfuric acid as a pretreatment acid to preferentially degrade the hemicelluloses present in the raw material. This treatment can, however, have the undesirable effect of also degrading the α-cellulose polymer chain with subsequent loss of intrinsic viscosity and molecular weight of the cellulose acetate product. Advantageously, the high temperature acetylation of the present invention preferentially degrades the hemicelluloses in the cellulose raw material causing them to be soluble in acetic acid but without substantial loss of intrinsic viscosity and molecular weight of the celluloe acetate product. Thus, the amount of sulfuric acid used as a pretreatment may be reduced or even eliminated while maintaining the high molecular weight α-cellulose intact.

The activation and pretreatment of a cellulose raw material for acetylation according to this invention may be carried out by processes known in the art. For example, the following process may be used to activate and pretreat a cellulose raw material: Cellulose may be slurried in water or aqueous acetic acid at about 25° C. to 50° C. for about 30 to 60 minutes. The water may then be removed and replaced with acetic acid. The cellulose may then be contacted with acetic acid or acetic acid containing about 0.1% to 20% of sulfuric acid by weight per 100 weight parts dry cellulose at about 25° C. to 35° C. for about 30 to 60 minutes depending on the type of cellulose used. This treatment produces a slurry of the cellulose raw material in the acetic acid. An amount between about 0.1% and 2% sulfuric acid is preferred for use with high alpha grades cellulose, such as acetylation-grade cellulose. About 2% to 20% is preferably used with low α-cellulose raw materials. When sulfuric acid is used in the cellulose activation and pretreatment, it may preferably be neutralized, for example with sodium acetate, before acetylation. Other common additives, known in the art, may also be included in the activation and pretreatment steps. This activation and pretreatment yields an acetic acid activated and pretreated cellulose raw material.

The bisulfate compounds useful as catalyst for this invention are the partial inorganic salts of sulfuric acid including sodium, potassium, and lithium bisulfates. Sodium or potassium bisulfate represent preferred catalysts and sodium bisulfate, the most preferred. The bisulfate catalysts are generally present in amount ranging from about 0.5 to 40 weight parts per 100 weight parts dry cellulose. More preferably, the bisulfate catalyst is present from about 10 to 30 weight parts per 100 weight parts dry cellulose.

In a preferred embodiment, the bisulfate catalyst may be used in combination with a strong Bronsted acid co-catalyst, preferably an inorganic Bronsted acid. Though strong acids, Bronsted acids should preferably not corrode the reaction vessels or pose undue environmental or health risks. Preferred Bronsted acids useful as co-catalysts in conjunction with the bisulfate catalyst include sulfuric acid, perchloric acid, or phosphoric acid. Sulfuric acid and phosphoric acid are preferred, with sulfuric acid being most preferred. A preferred catalyst combination is sodium bisulfate and sulfuric acid.

When a bisulfate compound and a strong Bronsted acid co-catalyst are used in combination as the catalyst for acetylation, the acidic compound may be combined with acetic acid and/or acetic anhydride, and then added to the activated and pretreated cellulose. Alternatively, the Bronsted acid may be mixed with bisulfate in acetic acid and/or acetic anhydride before addition to the activated cellulose.

The Bronsted acid may be an acid, such as sulfuric acid, used in the activation and pretreatment steps. When more than the desired amount of sulfuric acid is used in the activation and pretreatment steps, the excess sulfuric acid is neutralized with sodium acetate before acetylation resulting in the desired amount of acid needed as the co-catalyst.

When a catalyst combination is employed, 0.05 to 10 weight parts of a strong Bronsted acid co-catalyst per 100 weight parts of the dry cellulose may be used. Preferably, the bisulfate catalyst is present in an amount of 1 to 10 weight parts per 100 weight parts dry cellulose and the co-catalyst is present in an amount of 0.1 to 5 weight parts per 100 weight parts dry cellulose. For sulfuric acid co-catalyst, up to about 4 weight parts per 100 weight parts of cellulose is generally preferred. In a further preferred embodiment, the bisulfate catalyst is present in an amount of 2 to 5 weight parts per 100 weight parts dry cellulose and the Bronsted acid in an amount of 0.1 to 1.5 weight parts per 100 weight parts dry cellulose.

The present invention, empolying reduced amounts of sulfuric acid co-catalyst, provides other significant advantages over conventional, sulfuric acid catalyzed acetylation processes. The process of the present invention produces cellulose acetate products with relatively low combined sulfate residue. This affords better stability during thermal processing. Good thermal stability is particularly important when cellulose acetate polymers are used in plastics applications which employ elevated production temperatures.

Reducing the amount of sulfuric acid co-catalyst also advantageously results in lower amounts of insoluble metallic sulfate salts in the process. In prior art processes, the insoluble sulfate salts are known to foul production equipment and piping causing costly shut downs and repairs.

With the present invention, the acetylation of cellulose is conducted by combining the activated and pretreated cellulose in a typical reactor, or acetylator, and the bisulfate catalyst, with or without the strong Bronsted acid co-catalyst. Acetic anhydride, 2 to 4 weight parts by dry weight of the cellulose and acetic acid, 4 to 6 weight parts by dry weight of the cellulose, may also added to solubilize the catalyst or catalyst combination in the activated and pretreated cellulose. In a preferred embodiment, 3 to 3.5 weight parts acetic anhydride and about 4 weight parts acetic acid are used. The catalyst or catalyst combination, the acetic anhydride and the acetic acid may be added separately or in any combination to the activated and pretreated cellulose. Preferably, they are added as a premixed composition. As discussed above, the Bronsted acid co-catalyst, if present, may be the acid, for example the sulfuric acid, used in the acetic acid activation and pretreatment step.

The temperature of acetylation in accordance with this invention may range from about 40° C. to about 90° C. with a range of about 60° C. to about 70° C. being preferred. The temperature may vary with the amount and type of co-catalyst used. In general, there is no need of external cooling or heating during acetylation reaction. The cellulose acetylation according to the present invention may preferably be performed adiabatically. When a bisulfate is the only catalyst used however, some external heating may be necessary.

The process of the present invention may be carried out using typical cellulose acetylation equipment. This acetylation process, as one of ordinary skill would appreciate, is suitable for manufacturing cellulose acetate by a batch process or a continuous process.

The cellulose acetate produced by the process of this invention is generally referred to as primary cellulose acetate. Primary acetate is substantially cellulose triacetate wherein the degree of substitution (DS) of the cellulose approaches 3.0. The primary cellulose acetate produced by this process may be hydrolyzed in aqueous acid medium, preferably aqueous acetic acid, to produce cellulose acetate products of any desired content of hydroxyl group using hydrolysis processes known in the art. For example, the primary cellulose acetate may be hydrolyzed to secondary acetate having a degree of substitution of about 2.5. Preferably the hydrolysis is accomplished using aqueous acetic acid containing 3 to 16 weight percent water and 0.5 to 2 weight percent sulfuric acid per 100 weight parts dry cellulose with 8 to 10 weight parts water and 1 to 1.5 weight parts sulfuric acid being most preferred. The preferred temperature for the hydrolysis is about 60° C. to about 90° C., preferably about 70° C. to about 80° C. The desired cellulose acetate products are isolated by precipitation from aqueous acetic acid, washed with water and dried using techniques known in the art. The cellulose acetate produced according to the invention is suitable for all the uses known for conventionally produced cellulose acetate.

EXAMPLES

The following examples are given to illustrate, not limit, the present invention. In the examples, cellulose was activated by soaking in distilled water followed by three solvent exchanges with glacial acetic acid. In some examples, cellulose was activated with water and the water was displaced by acetic acid before the cellulose was pretreated with additional acetic acid containing a desired amount of sulfuric acid at 25° C. to 40° C. for 0.5 to 3 hours. If needed, an appropriate amount of sodium acetate in acetic acid was then added to above mixture to adjust the total catalyst concentration to the specified level. See Example 4.

The activated and pretreated cellulose was then added to a three-necked round bottom flask equipped with a mechanical stirrer and thermometer. The catalyst or catalyst combination in specified amounts was mixed with proper amounts of acetic anhydride and acetic acid diluents to form a solution and then added to the cellulose in the reaction flask with mixing. The total amounts of acetic acid and acetic anhydride are reported in the examples.

The resulting acetylation mixture was then allowed to react at a specified temperature until a clear, substantially gel-free solution was obtained. Heat was applied, if needed, to maintain the specified reaction temperature. From the clear solution, the primary cellulose acetate was isolated by precipitation in dilute aqueous acetic acid, recovered, washed with water, and dried as is familiar to one skilled in the art.

When hydrolysis to a partially substituted cellulose acetate product was desired, the clear primary cellulose acetate solution was adjusted to contain the specified amount of water and sulfuric acid, then hydrolyzed at the specific temperature for a specific time. As indicated, other acidic compounds can be used as catalysts for hydrolysis. The hydrolyzed cellulose acetate products were isolated as described above.

The key properties used to characterize the cellulose acetate product were Intrinsic Viscosity (IV), Absolute Molecular Weight (AMW), Weight Average Degree of Polymerization (DP), Acetyl content or degree of substitution (DS), and Residual Sulfur content (Sulfur). IV was determined in DMSO solution. DP was calculated from the weight average absolute molecular weight determined by Gel Permeation Chromatograph using 1-Methyl-2-pyrrolidinone as solvent. DS was determined by $^1$H NMR in d-6 DMSO containing several drops of trifluoroacetic acid. Sulfur was determined by a combination of X-ray Fluorescence Spectrometry and Ion Chromatograph methods.

Example 1

The reagents set forth below were subjected to the standard procedure described above under the standard reaction conditions, except as indicated below. The results in terms of the key properties for the product are set forth below.

| Cellulose | Placetate F |
| (part) | 100 |
| Activation/Pretreatment | Water |
| (Temperature & Time) | 25° C.; 30 min |
| Acetic Anhydride (part) | 350 |
| Acetic Acid (part) | 1150 |
| Catalyst | Sodium Bisulfate |
| (part) | 10-20-30 |
| Acetylation Temperature | 65° C. |
| Results: | |

| NaHSO$_4$ (part) | IV (DMSO) | Acetyl (DS) |
| --- | --- | --- |
| 10 | 2.9 | 2.85 |
| 20 | 3.4 | 2.71 |
| 30 | 3.0 | 2.74 |

This example demonstrated that cellulose acetate of exceptional IV may be synthesized by the process of this invention using softwood cellulose with high purity (high α-cellulose content).

Example 2

The reagents set forth below were subjected to the standard procedure described above under the standard reaction conditions, except as indicated below. The results in terms of the key properties of the product are also set forth below.

| Cellulose | Natchez HVX |
| (part) | 100/200 |
| Activation/Pretreatment | Water |
| (Temperature & Time) | 25° C.; 30 min |
| Acetic Anhydride (part) | 350/700 |
| Acetic Acid (part) | 1500/2300 |
| Catalyst | Sodium Bisulfate |
| (part) | 30/60 |
| Acetylation Temperature | 65° C./85° C. |
| Results: | |

| Cellulose Acetyl (part) (DS) | NaHSO$_4$ (part) | Temperature (°C.) | IV (DMSO) |
| --- | --- | --- | --- |
| 100 2.77 | 30 | 85 | 3.31 |
| 200 2.75 | 60 | 65 | 1.65 |

This example demonstrated that cellulose acetate of exceptional IV may be synthesized by the process of this invention using hardwood cellulose with moderate purity.

Example 3

The reagents set forth below were subjected to the standard procedure described above under the standard reaction conditions, except as indicated below., The results in terms of the key properties of the product are also set forth below.

| Cellulose (part) | Viscocell (Cuene IV = 2.84) 100 |
| --- | --- |
| Activation/Pretreatment (Temperature & Time) | Water 25° C.; 30 min |
| Acetic Anhydride (part) | 350 |
| Acetic Acid (part) | 1150 |
| Catalyst (part) | Sodium Bisulfate 15 |
| Acetylation Temperature | 70° C. |
| Results: | |

| Run (#) | IV (DMSO) | Acetyl (DS) |
| --- | --- | --- |
| 1 | 2.69 | 2.84 |
| 2 | 1.40 | 2.75 |
| 3 | 2.66 | 2.85 |

This example demonstrated that cellulose acetate of exceptional IV may be synthesized by the process of this invention using softwood cellulose with low purity (low α-cellulose content) and low molecular weight.

Example 4

The reagents set forth below were subjected to the standard procedure described above under the standard reaction conditions except as indicated below. The results in terms of the key properties of the product are also set forth below.

| Cellulose (part) | Temsolv (Cuene IV = 4.58, $S_{10} = 9.2$, $S_{18} = 6.2$)[a] 100 |
| --- | --- |
| Activation (Temperature & Time) Pretreatment: | Water 25° C.; 30 min |
| Sulfuric Acid (part) (Temperature & Time) | 2.0/4.0 30° C.; 60 min |
| Acetic Anhydride (part) | 350 |
| Acetic Acid (part) | 1200 |
| Catalyst[b]: | |
| Sodium Bisulfate (part) | 2.0/4.0/6.0 |
| Sulfuric Acid (part) | 0/0.15 |
| Acetylation Temperature | 70° C. |
| Results: | |

| Catalyst (part) | | IV | Acetyl | DP | Sulfur |
| --- | --- | --- | --- | --- | --- |
| NaHSO$_4$ | H$_2$SO$_4$ | (DMSO) | (DS) | (Wt. Av.) | (ppm) |
| 2.0 | 0.15 | 1.81 | 2.95 | 460 | 101 |
| 4.0 | 0.15 | 1.90 | 2.90 | 481 | 120 |
| 6.0 | 0.0 | 1.77 | 2.89 | 449 | 111 |

Notes:
[a]$S_{10}$ = solubility in 10% aqueous solution of NaOH,
$S_{18}$ = solubility in 18% aqueous solution of NaOH.
[b]Sufficient sodium acetate was added at the end of the pretreatment stage to achieve the indicated amounts of catalyst and co-catalyst (NaHSO$_4$ and H2SO$_4$).

This example demonstrated that cellulose acetate of exceptional IV and DP may be synthesized by the process of this invention using a low-cost cellulose with very low purity (low α-cellulose content).

Example 5

The reagents set forth below were subjected to the standard procedure described above under the standard reaction conditions, except as indicated below. The results in terms of the key properties of the product are also set forth below.

| Cellulose (part) | Placetate F 100 |
| --- | --- |
| Activation/Pretreatment (Temperature & Time) | Water 25° C.; 30 min |
| Acetic Anhydride (part) | 350 |
| Acetic Acid (part) | 1150 |
| Catalyst: | |
| Sodium Bisulfate (part) | 1.0–8.0 |
| Sulfuric Acid (part) | 0.05–0.4 |
| Acetylation Temperature | 65° C. |
| Results: | |

| Catalyst (part) | | | | |
| --- | --- | --- | --- | --- |
| NaHSO$_4$ Sulfur (ppm) | H$_2$SO$_4$ | IV (DMSO) | DP (Wt. Av.) | Acetyl (DS) |
| 1.0 25 | 0.05 | 1.79 | 1069 | 2.88 |
| 2.0 44 | 0.10 | 1.84 | 1090 | 2.88 |
| 4.0 31 | 0.20 | 1.88 | 804 | 2.89 |
| 8.0 85 | 0.40 | 1.74 | 666 | 2.84 |

This example demonstrated that cellulose acetate with exceptional molecular weight (IV, DP) and very low residual sulfur content, and thus excellent heat stability, may be produced by the process of this invention using the combination of a bisulfate and sulfuric acid as an acetylation catalyst.

Example 6

The reagents set forth below were subjected to the standard procedure described above under the standard reaction conditions, except as indicated below. The results in terms of the key properties of the product are also set forth below.

| Cellulose (part) | Placetate F 100 |
| --- | --- |
| Activation/Pretreatment Temperature & Time | Water 25° C.; 30 min |
| Acetic Anhydride (part) | 350 |
| Acetic Acid (part) | 1150 |
| Catalyst: | |
| Sodium Bisulfate (part) | 1.0–8.0 |
| Phosphoric Acid (part) | 1.0–8.0 |
| Acetylation Temperature | 65° C. |
| Results: | |

| Catalyst (part) | | | | |
| --- | --- | --- | --- | --- |
| NaHSO$_4$ Sulfur (ppm) | H$_3$PO$_4$ | IV (DMSO) | DP (Wt. Av.) | Acetyl (DS) |
| 1.0 32 | 1.0 | 1.82 | 1219 | 2.88 |
| 2.0 34 | 2.0 | 2.02 | 1313 | 2.88 |
| 4.0 52 | 4.0 | 1.90 | 1078 | 2.86 |
| 8.0 92 | 8.0 | 1.91 | 887 | 2.81 |

This example demonstrated that an acetylation process according to the invention can be used to produce cellulose acetate with exceptional molecular weight (IV, DP) and very low residual sulfur content. Thus, excellent heat stability may be achieved by the process of this invention using a combination of a bisulfate and phosphoric acid as catalyst.

Example 7

The reagents set forth below were subjected to the standard procedure described above under the standard reaction conditions, except as indicated below. The results in terms of the key properties of the product are also set forth below.

| Cellulose | Placetate F |
|---|---|
| (part) | 100 |
| Activation/Pretreatment | Water |
| (Temperature & Time) | 25° C.; 30 min |
| Acetic Anhydride (part) | 350 |
| Acetic Acid (part) | 1150 |
| Catalyst: | |
| Sodium Bisulfate (part) | 2.0 |
| Sulfuric Acid (part) | 0.1 |
| Acetylation Temperature | 65° C. |
| Hydrolysis: | |
| Hydrolysis Medium | Aqueous Acetic Acid |
| Water in Acetic Acid | 12% by weight |
| Hydrolysis Temperature | 80° C. |
| Hydrolysis Catalyst | 0.1% $H_2SO_4$ by Wt. of cellulose |
| Results: | |

| IV (DMSO) | DP (Wt. Av.) | Acetyl (DS) | Sulfur (ppm) |
|---|---|---|---|
| 1.92 | 1203 | 2.65 | 55 |

This example demonstrated that acetone soluble secondary cellulose acetate of exceptional molecular weight (IV, DP) and low residual sulfur content may be synthesized. by hydrolysis of the primary cellulose acetate produced by the process of this invention.

Example 8

The reagents set forth below were subjected to the standard procedure described above under the Standard reaction conditions, except as indicated below. The results in terms of the key properties of the product are also set forth below.

| Cellulose | Placetate F |
|---|---|
| (part) | 100 |
| Activation/Pretreatment | Water |
| (Temperature & Time) | 25° C.; 30 min |
| Acetic Anhydride (part) | 350 |
| Acetic Acid (part) | 1150 |
| Catalyst: | |
| Sodium Bisulfate (part) | 2.0 |
| Phosphoric Acid (part) | 2.0 |
| Acetylation Temperature | 65° C. |
| Hydrolysis: | |
| Hydrolysis Medium | Aqueous Acetic Acid |
| Water in Acetic Acid | 12% by weight |
| Hydrolysis Temperature | 80° C. |
| Hydrolysis Catalyst | 2.0% $H_3PO_4$ by Wt. of cellulose |
| Results: | |

| IV (DMSO) | DP (Wt. Av.) | Acetyl (DS) | Sulfur (ppm) |
|---|---|---|---|
| 1.86 | 1033 | 2.55 | 41 |

This example demonstrated that acetone soluble secondary cellulose acetate of exceptional molecular weight (IV, DP) and low residual sulfur content may be synthesized by hydrolysis of the primary cellulose acetate produced by the process of this invention using phosphoric acid as the catalyst for hydrolysis.

The claimed invention is:

1. A process for the manufacture of cellulose acetate comprising reacting at a temperature suitable for acetylation:
   an acetic acid activated and pretreated cellulose raw material containing 100 parts cellulose by weight; and
   0.5 to 40 parts of a bisulfate catalyst by dry weight of the cellulose, the bisulfate catalyst being selected from lithium bisulfate, sodium bisulfate, and potassium bisulfate.

2. A process of claim 1, wherein the bisulfate catalyst is present in an amount of 10 to 30 parts by dry weight of the cellulose and the reaction temperature ranges from about 40° C. to about 90° C.

3. A process of claim 1, further comprising 0.05 to 10 parts of a strong Bronsted acid co-catalyst by weight of the dry cellulose.

4. A process of claim 1, wherein the bisulfate catalyst is present in an amount of 1 to 10 parts by dry weight of the cellulose and the co-catalyst is present in an amount of 0.1 to 5 parts by dry weight of the cellulose and is selected from sulfuric acid, phosphoric acid, and perchloric acid.

5. A process of claim 1, wherein the bisulfate catalyst is sodium bisulfate and is present in an amount of 2 to 5 parts by dry weight of the cellulose, and the co-catalyst is sulfuric acid and is present in an amount of 0.1 to 1.5 parts by dry weight of the cellulose.

6. A process of claim 1, further comprising the step of hydrolyzing the cellulose acetate to a partially substituted cellulose acetate.

7. A process of claim 1, wherein the cellulose is a low DP and low α-cellulose.

8. A process for the manufacture of cellulose acetate comprising reacting at a temperature suitable for acetylation
   an acetic acid activated and pretreated cellulose raw material containing 100 parts cellulose by weight;
   0.5 to 40 parts of a bisulfate catalyst by dry weight of the cellulose, the bisulfate catalyst being selected from lithium bisulfate, sodium bisulfate, and potassium bisulfate;
   2 to 4 parts of acetic anhydride by dry weight of the cellulose; and
   4 to 6 parts of acetic acid by dry weight of the cellulose.

9. A process of claim 8, wherein the bisulfate catalyst is sodium bisulfate and is present in an amount of 10 to 30 parts by dry weight of the cellulose, the acetic anhydride is present in an amount of 3 to 3.5 parts per dry weight of the cellulose, and the acetic acid is present in the amount of about 4 parts by dry weight of the cellulose.

10. A process of claim 8, wherein the reaction temperature ranges from about 40° C. to about 90° C.

11. A process of claim 8, wherein the reaction temperature ranges from about 60° C. to about 70° C.

12. A process of claim 8, further comprising 0.05 to 10 parts of a strong Bronsted acid co-catalyst by weight of the dry cellulose.

13. A process of claim 12, wherein the bisulfate catalyst is present in an amount of 1 to 10 parts by dry weight of the cellulose and the co-catalyst is present in an amount of 0.1 to 5 parts by dry weight of the cellulose and is selected from sulfuric acid, phosphoric acid, and perchloric acid.

14. A process of claim 12, wherein the bisulfate catalyst is sodium bisulfate and is present in an amount of 2 to 5 parts by dry weight of the cellulose, the acetic anhydride is present in an amount of 3 to 3.5 parts per dry weight of the cellulose, the acetic acid is present in the amount of about 4 parts by dry weight of the cellulose, and the co-catalyst is sulfuric acid and is present in an amount of 0.1 to 1.5 parts by dry weight of the cellulose.

15. A process of claim 12, wherein the reaction temperature ranges from about 40° C. to about 90° C.

16. A process of claim 12, wherein the reaction temperature ranges from about 60° C. to about 70° C.

17. A process of claim 14, further comprising the step of hydrolyzing the cellulose acetate to a partially substituted cellulose acetate.

18. A process of claim 8, wherein the cellulose is a low DP and low $\alpha$-cellulose.

* * * * *